Patented Oct. 31, 1922.

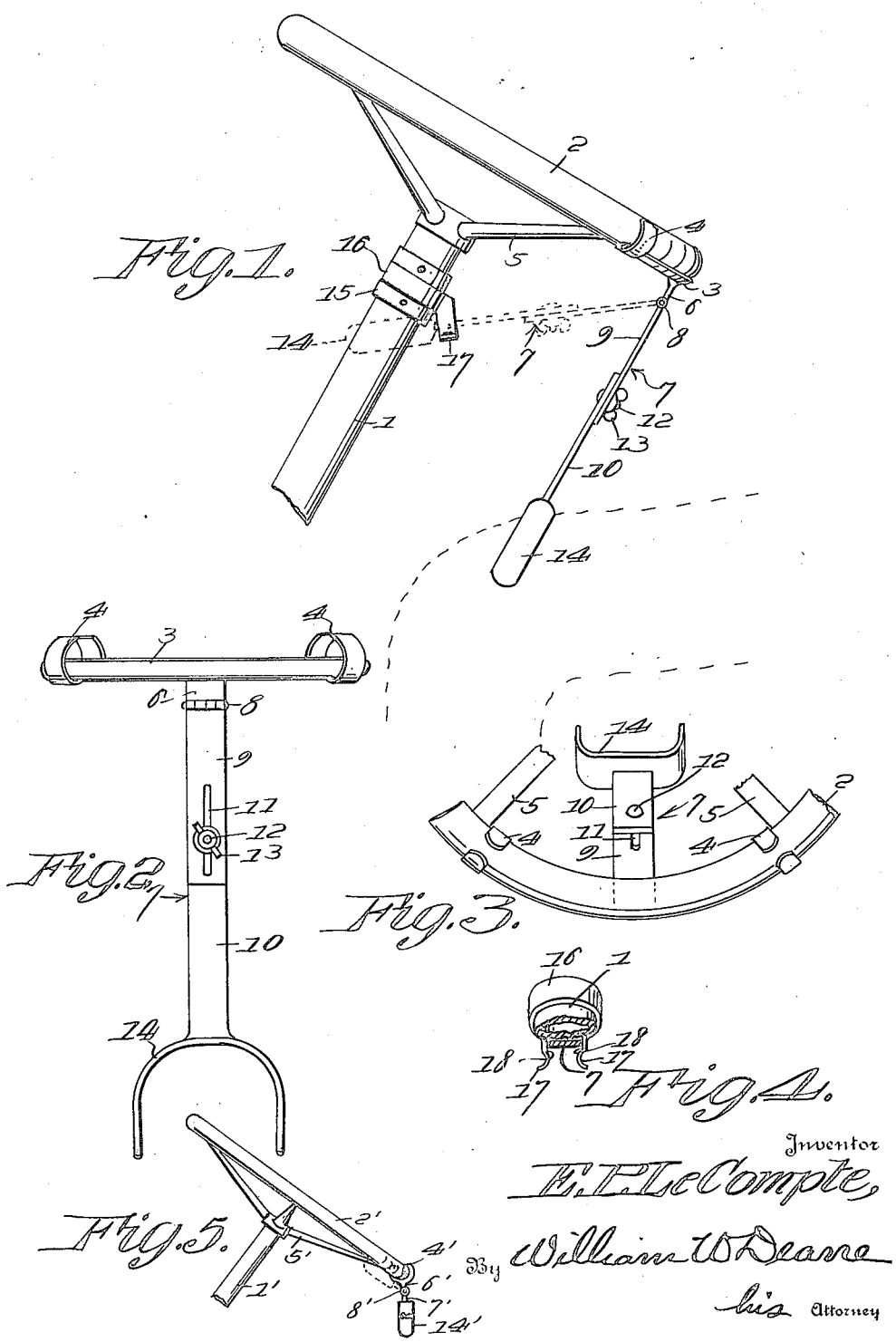

1,434,216

UNITED STATES PATENT OFFICE.

EDWARD P. LE COMPTE, OF PARK CITY, UTAH.

STEERING MECHANISM FOR MOTOR VEHICLES.

Application filed July 12, 1921. Serial No. 484,025.

*To all whom it may concern:*

Be it known that I, EDWARD P. LE COMPTE, a citizen of the United States, residing at Park City, in the county of Summit and State of Utah, have invented certain new and useful Improvements in Steering Mechanism for Motor Vehicles, of which the following is a specification, reference being had therein to the accompanying drawing.

This invention relates to improvements in steering mechanism for motor vehicles and more particularly to an auxiliary steering attachment designed to permit the operator to turn the steering wheel with the knee.

The primary object of the invention is to furnish an auxiliary steering attachment of simple and inexpensive construction which may be quickly attached and detached from the steering wheel and which may be held in an inoperative position when not in use.

Another object of the invention is to furnish a steering attachment which may be applied to the steering wheel without the use of bolts or nuts.

A further object of the invention is to provide an auxiliary steering attachment which is adjustable in length in order to accommodate the limbs of operators of various heights.

A further object of the invention is to provide an improved lock for holding the steering attachment in inoperative position and which will permit the turning of the steering wheel without interference by the steering attachment.

With the foregoing objects outlined, and with other objects in view which will appear as the description proceeds, the invention consists in the novel features hereinafter described in detail, illustrated in the accompanying drawing, and more particularly pointed out in the appended claims.

Referring to the drawing:

Figure 1 is a side view of a steering wheel and a portion of its post, and showing the improved steering attachment applied thereto.

Fig. 2 is a front view of the steering attachment detached from the steering wheel and post.

Fig. 3 is a top plan view of the steering attachment and a portion of the steering wheel.

Fig. 4 is a detail view partly in section of the means for locking the steering attachment to the steering post.

Fig. 5 is a side view of a simple and preferred form of the invention.

In the drawing, 1 designates a steering post of ordinary construction carrying a steering wheel 2. The improved steering attachment is designed to be secured to the wheel 2 and it preferably consists of an arc shaped plate 3 of channel shaped cross section provided at its ends with clasps 4 formed of oppositely disposed resilient fingers which have their free ends spaced apart and are adapted to be slipped over the rim of the steering wheel and abut against a plurality of the spokes 5 of the wheel. With this construction the steering attachment may be readily attached to and detached from the steering wheel and when in position on the wheel the clasps 4 will abut against the spokes 5 so that the wheel will turn with the steering attachment. The plate 3 is provided with a depending arm 6, and a swinging arm 7 has its upper end pivotally connected to the arm 6 by means of a hinge 8. The arm 7 is formed of a relatively fixed part 9 and an extensible part 10, the former having an elongated slot 11 engaged by a threaded bolt 12 fixed to the latter, and a thumb nut 13 engages the bolt for securing the parts in position. The member 10 terminates in a fork 14 which is adapted to be engaged by the knee of the operator, and it is apparent that movement of the member 14 around the post 1 will cause the wheel 2 to steer the machine. By adjusting the parts 9 and 10 relatively to each other, the swinging arm 7 may be lengthened or shortened to accommodate the limbs of drivers of various heights.

When the auxiliary attachment is not in use it may be detached from the wheel by drawing off the clasps 4, but if desired, the auxiliary attachment may remain attached to the wheel and be swung into an inoperative position. To permit this, the steering post is provided with a supporting bracket 15 on which rests a rotatable collar 16 having outwardly extending resilient arms 17 designed to be engaged by the swinging arm 7 of the steering attachment. When the swinging arm is forced between the resilient arms, said arms will spread apart to permit the swinging arm 7 to be engaged by shoulders 18. The swinging arm 7 may be detached from the resilient arms 17 by pulling the swinging arm in a direction away from the steering post, and when the swinging arm engages the resilient arms 17 and the steering post is turned, the arms 17 will turn with the collar 16 and will not interfere with the rotation of the wheel.

In Fig. 5 I have illustrated the preferred form of the invention and in this embodiment 1′ is the steering post, 2′ the steering wheel, 4′ a single resilient clasp grasping the wheel, 6′ a depending extension of said clasp, 7′ a swinging arm pivoted at 8′ to the extension, and 14′ the fork which is engaged by the operator's knee. This form of the invention is particularly adapted for Ford automobiles and it is of very simple and inexpensive construction.

From the foregoing I believe that the construction, operation and advantages of the invention may be readily understood by those skilled in the art, and I am aware that various changes may be made in the construction illustrated without departing from the spirit of the invention as expressed in the following claims.

What I claim and desire to secure by Letters Patent is:

1. An auxiliary steering attachment for motor vehicles comprising a supporting member provided with means for frictionally and detachably securing the same to a steering wheel, and an arm pivotally connected to said member and provided with means engageable with an operator's limb to permit the operator to turn the steering wheel by one of his limbs, said arm consisting of a plurality of relatively extensible parts pivotally and adjustably connected together to accommodate different operators and to permit folding of said attachment.

2. An auxiliary steering attachment for steering wheels including an arc shaped supporting plate of channel shaped cross section designed to engage the rim of the steering wheel, a plurality of resilient clasps provided on said plate and adapted to frictionally clasp the steering wheel, and an arm carried by the supporting plate and provided with means for engaging the operator's limb.

3. An auxiliary steering attachment for steering wheels including a supporting plate, resilient clasps carried by the supporting plate and designed to frictionally clasp the rim of a steering wheel, an arm depending from said plate, an extensible arm pivotally connected to the first mentioned arm and consisting of a plurality of members, one of which is provided with a slot and the other of which has a bolt extending through said slot and furnished with a nut, and a fork connected to the extensible arm and adapted to be engaged by the operator's limb.

4. In combination, an auxiliary steering attachment including a pivotally mounted arm operatively connected to a steering wheel and provided with means designed to engage an operator's limb, a steering post, and a rotatable member mounted on the steering post and provided with resilient arms designed to clasp the swinging arm and hold the same in inoperative position.

In testimony whereof I hereunto affix my signature in the presence of two witnesses.

EDWARD P. LE COMPTE. [L. S.]

Witnesses:
J. B. GREY,
OSKER WALTON.